United States Patent

Katsuyama

3,688,673
Sept. 5, 1972

[54] LIGHT RECEIVING MEANS IN AUTOMATIC FOCUSING DEVICE

[72] Inventor: Yoshihisa Katsuyama, Kawasaki, Japan

[73] Assignee: Nippon Kogaku K.K., Tokyo, Japan

[22] Filed: Nov. 20, 1970

[21] Appl. No.: 91,454

[30] Foreign Application Priority Data

Nov. 27, 1969 Japan ......................44/94623

[52] U.S. Cl.....................95/44 R, 350/187, 356/123, 356/124
[51] Int. Cl................................................G03b 3/00
[58] Field of Search .......95/44 R, 44 C, 42; 356/122, 356/123, 124, 126; 350/187

[56] References Cited
UNITED STATES PATENTS 3,511,155   5/1970   Yamada.....................95/44 R
3,542,475   11/1970  Cooper ..................95/44 C X
3,270,647   9/1966   Jakob et al..................95/44 C

*Primary Examiner*—Samuel S. Matthews
*Assistant Examiner*—Richard A. Wintercorn
*Attorney*—Ward, McElhannon, Brooks & Fitzpatrick

[57] ABSTRACT

A light receiving optical means in an automatic focusing device used in a camera includes an optical image multiplier member disposed in a light receiving path for dividing and deflecting a light beam from an object to be photographed, whereby plural images of the object are formed on a photo-conductive element forming the light receiving portion of the device to thereby produce an electrical output which will ensure automatic focusing.

4 Claims, 10 Drawing Figures

PATENTED SEP 5 1972    3,688,673

LIGHT RECEIVING MEANS IN AUTOMATIC FOCUSING DEVICE

BACKGROUND OF THE INVENTION

1. Field of the Invention

This invention relates to an automatic focusing device in a camera, and more particularly to light receiving optical means in such focusing device.

2. Description of the Prior Art

There has already been proposed an automatic focusing device having light receiving means including a photo-responsive surface divided in various directions by a number of electrodes so as to form numerous sections serving as separate tiny photo-sensitive portions, whereby these compartments constitute a number of electrodes for detecting and comparing the amounts of light incident on the respective compartments to thereby detect the focal point of an objective lens.

However, such light receiving means of the known type, which will be described later in greater detail, may fail to produce a necessary electrical output for the reasons to be described later, depending on the size of an object to be photographed.

SUMMARY OF THE INVENTION

The present invention has for its object to eliminate the foregoing drawback by multiplying the point image of an object into a plurality of point images.

To achieve such an object, the light receiving optical means of the present invention used in an automatic focusing device comprises an optical image multiplier member disposed in a light receiving path for dividing and deflecting a light beam from an object to be photographed.

The above object and features of the present invention will become fully apparent from the following detailed description taken in conjunction with the accompanying drawings.

DESCRIPTION OF THE PREFERRED EMBODIMENTS

Figure 1:
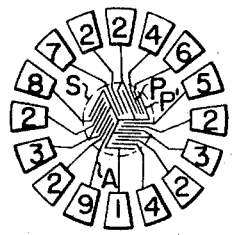
FIG. 1 is a plan view showing the electrodes in a photocell according to the prior art.
Figure 2:
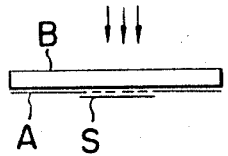
FIG. 2 is a cross-sectional view of the photocell of FIG. 1.
Figure 3:
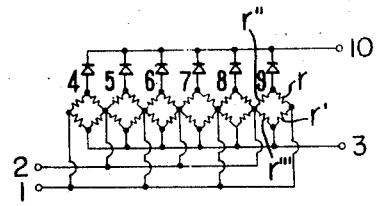
FIG. 3 is a diagram of a known electric circuit constituting a focus detecting portion by using the photocell of FIG. 1.

Description will first be made of the prior art in order to make the present invention better understood. In the light receiving means of the known type, a number of electrodes A having light receiving portions P and P' opposed to each other at intervals substantially equal to the diameter of the circle of least confusion of an objective lens in use, as shown in FIG. 1, and a photoconductive element S are closely attached to a transparent base B made of, for example, CdS in the manner as shown in FIG. 2, thereby providing a photo-responsive surface. By utilizing resistances $r$ to $r'''$ of the photoconductive element interposed between the adjacent electrodes, a number of Wheatstone bridges are formed as shown in FIG. 3. An AC voltage is applied between terminals 1 and 2 to produce an output between terminals 3 and 10 when an imbalance occurs in any one of the Wheatstone bridges.

Figure 4:
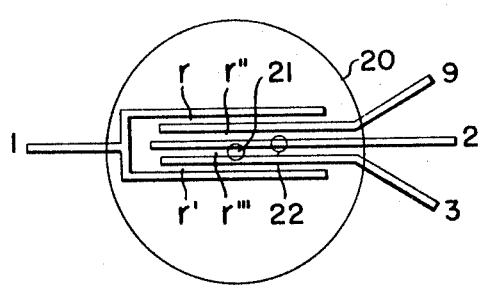
FIG. 4 is an enlarged plan view showing a portion of FIG. 1.
Figure 5:
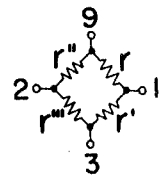
FIG. 5 shows the connection between the electrodes in FIG. 4.

If a real image of an object to be photographed such as point source of light is formed on the above-described photo-responsive surface through an objective lens, the image thus formed on the photo-responsive surface will be a bright circle, whose diameter has the smallest value to provide a point image when the image plane and the photo-responsive surface are in accord with each other, and becomes greater as the image plane moves away from the photo-responsive surface. When the formed image is a large circle as indicated at 20 in FIG. 4, the intensity of illumination is equal among terminals 1, 2, 3 and 9 so that the bridge of FIG. 5 is balanced. When the formed image is a point image as indicated at 21 in FIG. 4, only the value of the resistance $r'''$ between the terminals 2 and 3 of the electrode is reduced to cause an imbalance between the shunts of the bridge, thus resulting in the production of an output.

For ordinary objects to be photographed, no particular problem is encountered in utilizing the foregoing effect as the focusing pulse, because any ordinary object provides a plurality of such point images as will result in the bridge imbalance and thus the probability of null output is very small. However, in case of an object such as a miniature lamp or a black spot, providing only one point image, the single formed image may sometimes be located only on one electrode without overlapping any other adjacent electrode, as indicated at 22 in FIG. 4, thus resulting in no production of output. Such a drawback would be overcome to a certain degree by reducing the thickness of electrodes and the spacing therebetween, whereas this will entail not only great difficulties in the fabrication but also deterioration of the photoelectric characteristic of the electrodes.

Figure 7:
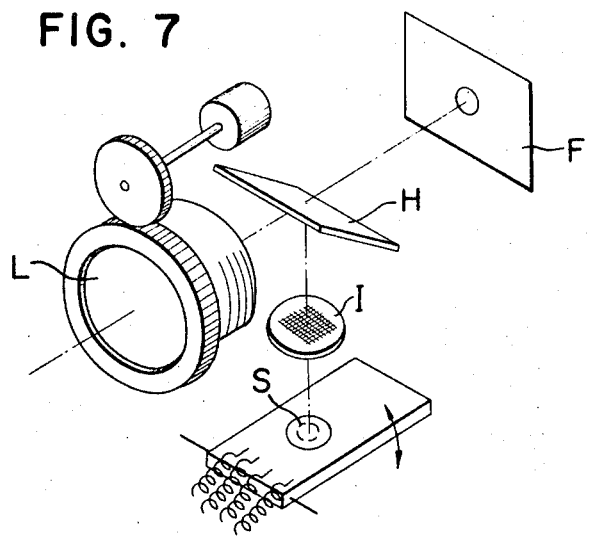
FIG. 7 is a fragmentary and schematic perspective view of a camera having an automatic focusing light receiving portion equipped with the image multiplier plate of FIG. 6.
Figure 8:
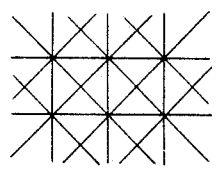
FIG. 8 is an enlarged fragmentary plan view of the image multiplier plate.
Figure 9:
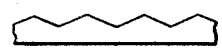
FIG. 9 is a cross-sectional view of the image multiplier plate of FIG. 8.

Referring now to FIG. 7, there is shown in perspective view an embodiment of the present invention, i.e., an example of the camera having an automatic focusing light receiving portion equipped with an image multiplier plate I. The camera includes an objective lens L, a focal plane F, a half-mirror H interposed between the lens L and focal plane F, and a photo-conductive element S of the same type as that described with respect to FIGS. 1 and 2. The image multiplier plate I is an optical image multiplier member comprising, as shown more clearly in FIGS. 8 and 9, a number of tiny pyramid-shaped prisms, which sides each have predetermined declinations. The optical image multiplier member is made of glass, transparent acrylic resin or the like. Thus, as shown in FIG. 10, a light beam directed from an object toward the photo-responsive surface S via the half-mirror H is divided and deflected by the ridges of the image multiplier plate I disposed in the light path, so that multiple images 23' and 23" are formed at predetermined points on the photo-responsive surface S.

Figure 10:
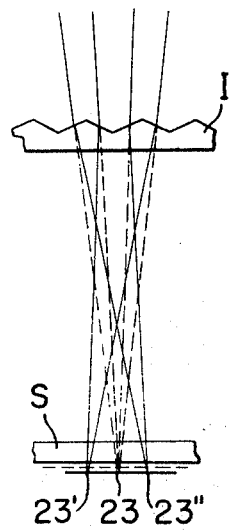
FIG. 10 is a schematic view for illustrating the principle of operation of the image multiplier plate according to the present invention.

If the light beam from the object is not subjected to the action of the image multiplier plate I, the light beam will pass along broken lines to form only one image 23 as shown in FIG. 10.

Figure 6:
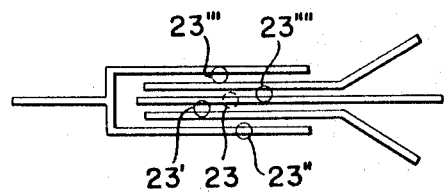
FIG. 6 illustrates the relation between the images of a point source of light multiplied by the image multiplier plate of the present invention and electrodes.

It will thus be seen that where the prisms forming the image multiplier plate I are quadrangular pyramids as in the illustrated embodiment, even an object such as miniature lamp or black spot will appear on the photo-responsive surface in the form of four point images as indicated at 23', 23", 23''' and 23'''' in FIG. 6, whereby the probability of null output is greatly reduced.

The image multiplier plate I should of course be so designed that the number and location of the multiple images formed on the photo-responsive surface may be ideal with respect to the shape and photoelectric characteristic of the electrodes, but it will be apparent to those skilled in the art that the image multiplier plate may be replaced by any one of the known split prism, deformation lens, mirror, or optical fiber, etc. which have the same operational effect as the plate I, and that the location of such optical multiplier member may be suitably changed as desired. The brightness of the multiple point images thus formed is necessarily lower than that of a single point image, whereas this forms no obstruction to carry out the present invention because such weaker brightness can be readily amplified by the known electrical means.

It will thus be appreciated that according to the present invention plural images of an object can be formed on the photo-conductive element with the aid of an optical image multiplier member and this ensures focusing to be automatically achieved even for any point source of light such as miniature lamp or other tiny object.

What is claimed is

1. In an automatic focusing apparatus for optical instruments, comprising
   an objective lens for forming an image of the object;
   a photoconductive light receiving means disposed to receive the light passing through the objective lens from the object;
   the photoconductive light receiving means being divided into a number of divisions by a number of electrodes, each of said divisions thereby constituting discrete, photosensitive means which generate an electrical signal in response to the intensity of the light of the image which is formed thereon, and
   means for axially displacing the objective lens in response to said electrical signal to make a sharp image of the object on the photoconductive light receiving means; the improvement comprising
   means for dividing and deflecting the light beam passing through said objective lens in order to form plural images on the photoconductive light receiving means,
   the light dividing means being disposed between the objective lens and the photoconductive light receiving means.

2. An apparatus as claimed in claim 1, wherein said dividing means includes a plurality of pyramidshaped prisms.

3. An apparatus as claimed in claim 1, wherein said dividing means includes a plurality of deformation lenses.

4. An apparatus as claimed in claim 1, wherein said dividing means includes a plurality of optical fibers.

* * * * *